(12) United States Patent
Hill et al.

(10) Patent No.: US 7,373,359 B2
(45) Date of Patent: May 13, 2008

(54) METHODS AND APPARATUS FOR EXTRACTION AND TRACKING OF OBJECTS FROM MULTI-DIMENSIONAL SEQUENCE DATA

(75) Inventors: Matthew L. Hill, Yonkers, NY (US); Yuan-Chi Chang, White Plains, NY (US); Chung-Sheng Li, Ossining, NY (US); Vittorio Castelli, White Plains, NY (US); Lawrence David Bergman, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 11/034,288

(22) Filed: Jan. 12, 2005

(65) Prior Publication Data

US 2005/0138023 A1 Jun. 23, 2005

Related U.S. Application Data

(62) Division of application No. 09/841,949, filed on Apr. 25, 2001, now Pat. No. 6,876,999.

(51) Int. Cl.
*G06F 17/30* (2006.01)
*G06F 15/16* (2006.01)

(52) U.S. Cl. .......................... 707/102; 707/3; 707/100; 709/223

(58) Field of Classification Search .................... 707/3, 707/4, 5, 100, 102
See application file for complete search history.

(56) References Cited

U.S. PATENT DOCUMENTS 6,353,818 B1 * 3/2002 Carino, Jr. ...................... 707/2
6,401,088 B1 * 6/2002 Jagadish et al. ............... 707/6

OTHER PUBLICATIONS

T. Bäck, "Evolutionary Algorithms in Theory and Practice," The Oxford University Press, Oxford, pp. 163-194, 1996.
J.H. Holland, "Adaptation in Natural and Artificial Systems," Ann Arbor: The University of Michigan Press; Second Edition, MIT Press, pp. 89-120, 1992.
Z.Q. Gu et al., "Comparison of Techniques for Measuring Cloud Texture in Remotely Sensed Satellite Meteorological Image Data," IEEE Proceedings—Radar and Signal Processing, vol. 136, Pt. F, No. 5, pp. 236-248, 1989.
B. Duc et al., "Motion Segmentation by Fuzzy Clustering with Automatic Determination of the Number of Motions," Proceedings of ICPR'96, IEEE, pp. 376-380, 1996.

(Continued)

*Primary Examiner*—Tony Mahmoudi
(74) *Attorney, Agent, or Firm*—Dwayne Nelson; Ryan, Mason & Lewis, LLP

(57) ABSTRACT

An object tracking technique is provided which, given: (i) a potentially large data set; (ii) a set of dimensions along which the data has been ordered; and (iii) a set of functions for measuring the similarity between data elements, a set of objects are produced. Each of these objects is defined by a list of data elements. Each of the data elements on this list contains the probability that the data element is part of the object. The method produces these lists via an adaptive, knowledge-based search function which directs the search for high-probability data elements. This serves to reduce the number of data element combinations evaluated while preserving the most flexibility in defining the associations of data elements which comprise an object.

15 Claims, 7 Drawing Sheets

OTHER PUBLICATIONS

S. Ayer et al., "Layered Representation of Motion Video Using Robust Maximum-Likelihood Estimation of Mixture Models and MDL Encoding," IEEE, pp. 777-784, 1995.

A. Moghaddamzadeh et al., "A Fuzzy Technique for Image Segmentation of Color Images," IEEE, pp. 83-88, 1994.

* cited by examiner

METHODS AND APPARATUS FOR EXTRACTION AND TRACKING OF OBJECTS FROM MULTI-DIMENSIONAL SEQUENCE DATA

CROSS REFERENCE TO RELATED APPLICATION

This application is a divisional of U.S. application Ser. No. 09/841,949, filed Apr. 25, 2001 now U.S. Pat. No. 6,876,999, the disclosure of which is incorporated by reference herein.

STATEMENT OF GOVERNMENT RIGHTS

This invention was made with Government support under grant contract number NCC5-305 awarded by the National Aeronautics and Space Administration (NASA). The Government has certain rights in this invention.

FIELD OF THE INVENTION

The present invention relates to data segmentation and classification techniques and, more particularly, to data segmentation and classification techniques as applied to image and video signal processing.

BACKGROUND OF THE INVENTION

Object tracking, in particular, rigid object tracking, has been intensively studied in the area of computer vision and video coding in terms of motion compensation, such as those techniques used in MPEG-1 and MPEG-2 (Motion Picture Expert Group 1 and 2), see, e.g., B. Duc et al., "Motion Segmentation by Fuzzy Clustering with Automatic Determination of the Number of Motions," Proceedings of the 13th International Conference on Pattern Recognition, vol. 4, pp. 376-380, 1996; S. Ayer et al., "Layered Representation of Motion Video Using Robust Maximum-Likelihood Estimation of Mixture Models and MDL Encoding," Proceedings, Fifth International Conference on Computer Vision, pp. 777-784, 1995; A. Moghaddamzadeh et al., "A Fuzzy Technique for Image Segmentation of Color Images," IEEE World Congress on Computational Intelligence., Proceedings of the Third IEEE Conference on Fuzzy Systems, vol. 1, pp. 83-88, 1994, the disclosures of which are incorporated by reference herein.

Object tracking in computer vision or video coding involves the tracking of viewable objects which have a motion aspect associated therewith. The motion aspect may be due to the motion (e.g., translation or rotation) of the object, itself, or the motion of the camera (e.g., panning) capturing the object, or both. Techniques for tracking objects involve, for example, block-based matching used in MPEG-1 and 2. The assumption usually made is that the object may not change shape much between adjacent frames, and therefore the matching function does not have to take into account rotational invariance. More sophisticated object tracking mechanisms include the use of possible perspectives derived from extracted object model(s) to locate possible matched objects. Nevertheless, these mechanisms typically do not handle situations where an object changes shape, splits, merges, or completely disappears and then reappears.

These situations, however, are quite common for data automatically collected from sensors. Some examples of such data are as follows.

(i) An image sequence collected by the NASA (National Aeronautic and Space Administration) satellite SOHO (Solar and Heliospheric Observatory), which takes a snapshot of the sun every 17 minutes. Different parts of the sun usually rotate at different speeds and, therefore, bright spots that appear to rotate may actually belong to the same bright spot. Some of the bright spots may suddenly become brighter and then disappear completely a few days later. This is the phenomenon known as "coronal mass ejection," which astrophysicists observe on a regular basis.

(ii) Medical images involving a digital X-ray or CT scan of a cancerous growth in a patient.

(iii) Images of a hurricane, which continuously changes shape, and sometimes splits or merges with other hurricanes.

The traditional object tracking mechanisms usually have difficulties in tracking these objects due to the lack of shape information. Consequently, deeper knowledge about the phenomenon and flexibility in selecting the candidate area for tracking is needed in order to track the development of the object.

SUMMARY OF THE INVENTION

The present invention provides a technique for adaptively developing and applying a knowledge-based search function in order to prune the search space of possible data element groupings. In one aspect of the invention, the technique assumes a Markovian model of object membership. That is, given a candidate data element, the highest-probability data element to "transition" to (i.e., add to the current object) depends only on the properties of the current and candidate data elements, and not on previous data elements in the transition list. This assumption allows for the characterization of a technique for assigning a final probability to a transition as the output of a "match function." A match function takes as input two data elements and returns a score, e.g., probability (although other types of scores may be generated, e.g., fuzzy membership functions, etc.). The probability represents the likelihood that the two data elements represent part of the same object. This probability is also referred to as a "match score."

A naive method for grouping data elements into objects might enumerate all possible groupings of data elements into objects and assign a probability to each transition between the pairs in each list. This would result in an extremely large number of transitions, even for relatively small numbers of data elements, e.g., for n data elements, the number of transitions would be on the order of n!.

Although the number of possible transitions is very large, the number of probable transitions is typically much smaller. Thus, a goal of a search function provided in accordance with the present invention is to direct the search for high-probablility transitions, so that only the probable transitions (i.e., transitions meaning data elements to be added to the current object list) are evaluated by the match function and added to the lists. In this manner, the search space can be pruned significantly.

The search function, given a data element, produces a list of other data elements which are likely to have high match scores with the given data element. The search function can be selected from a catalog of search functions, learned exclusively from sampling the input randomly, or custom-crafted for a given application. For example, an approach to segmenting images into regions representing physical objects can be accomplished by comparing the intensities of only neighboring pixels. In this case, the search function would generate the list of neighbors of the current pixel, and the match function would be used to compare the intensity of the current pixel to each pixel in the list.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As is known, image, image sequence, time series, and video data is non-structured. The volume of such data is usually large, often due to automated collection methods. In order to make effective interpretations of these data, it is necessary to impose structure by segmenting the data into groups of data elements to represent objects. Note that an object, in general, can be a phenomenon, an event, a rigid object such as a ball or a car, or a semi-rigid object like a human being. Typically, objects are represented by the aggregation of many data elements. For instance, the number of pixels forming a typical photographic image may number in the millions, but there are likely to be less than a dozen meaningful objects in the scene.

In accordance with the present invention, and as will be described in detail below, a technique is provided which, given: (i) a potentially large data set; (ii) a set of dimensions along which the data has been ordered; and (iii) a set of functions for measuring the similarity between data elements, produces a set of objects. Each of these objects is defined by a list of data elements. Each of the data elements on this list contains the probability that the data element is part of the object. The method produces these lists via an adaptive, knowledge-based search function which directs the search for high-probability data elements. This serves to reduce the number of data element combinations evaluated while preserving the most flexibility in defining the associations of data elements which comprise an object.

Figure 1:
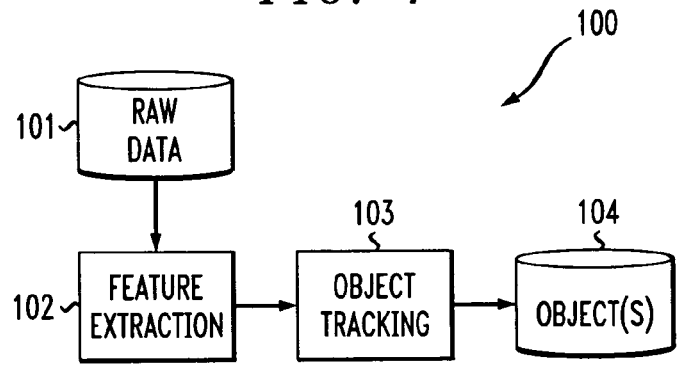
FIG. 1 is block diagram illustrating an overview of a generic object tracking system according to one embodiment of the present invention.

Referring initially to FIG. 1, a block diagram illustrates an overview of a generic object tracking system according to one embodiment of the present invention. As shown, the system 100 comprises: a raw data storage unit 101 for storing raw data; a feature extraction module 102 coupled to the raw data storage unit 101; an object tracking module 103 coupled to the feature extraction module 102; and an object storage unit 104 coupled to the object tracking module 103 for storing tracked objects.

In general, the object tracking system 100 tracks objects within raw data. That is, raw data elements from storage unit 101 are grouped by the system into sets which represent objects, which are stored in storage unit 104. This grouping is achieved by evaluating a match function applied by object tracking module 103 on image features (such as luminance, texture, etc.) extracted from the raw data in feature extraction module 102. It is to be understood that the feature extraction module 102 may extract features associated with the raw data in accordance with known feature extraction techniques, Z. Q. Gu et al. "Comparison of Techniques for Measuring Cloud Texture in Remotely Sensed Satellite Meteorological Image Data," IEEE Proceedings—Radar and Signal Processing, vol. 136, pp. 236-248, 1989, the disclosure of which is incorporated by reference herein.

The match function applied by module 103, given two data elements, computes whether or not the two elements are part of the same object. Objects comprising more than two data elements are created by merging pairs (or previously merged pairs) into sets in which at least one element of each pair is found to be part of the same object.

As will be explained in detail below, the object tracking module 103 advantageously performs a search function on the data elements before performing the matching function. As previously mentioned, a main reason for performing the search function is to direct a search for high-probability transitions, i.e., data elements likely to be added to an object grouping, so that only the probable transitions are evaluated by the match function and added to the object groupings. By applying such a search, the search space that the match function is subsequently applied to is significantly reduced. Among other advantages, such a reduction of the feature space to be processed results in a savings in computational resources, e.g., processor and memory capacity, as well as a savings in computation time.

Figure 2:
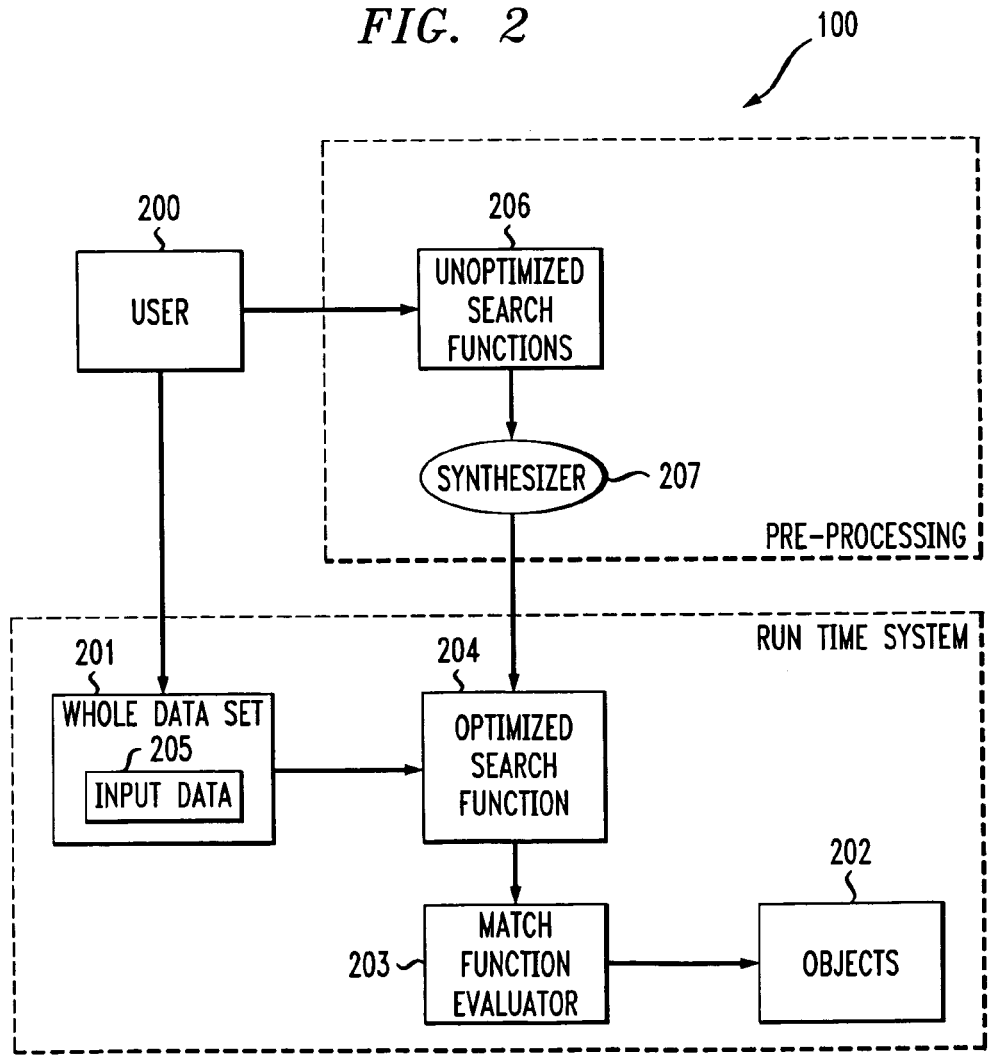
FIG. 2 is a block diagram illustrating a more detailed object tracking system according to one embodiment of the present invention.
Figure 3:
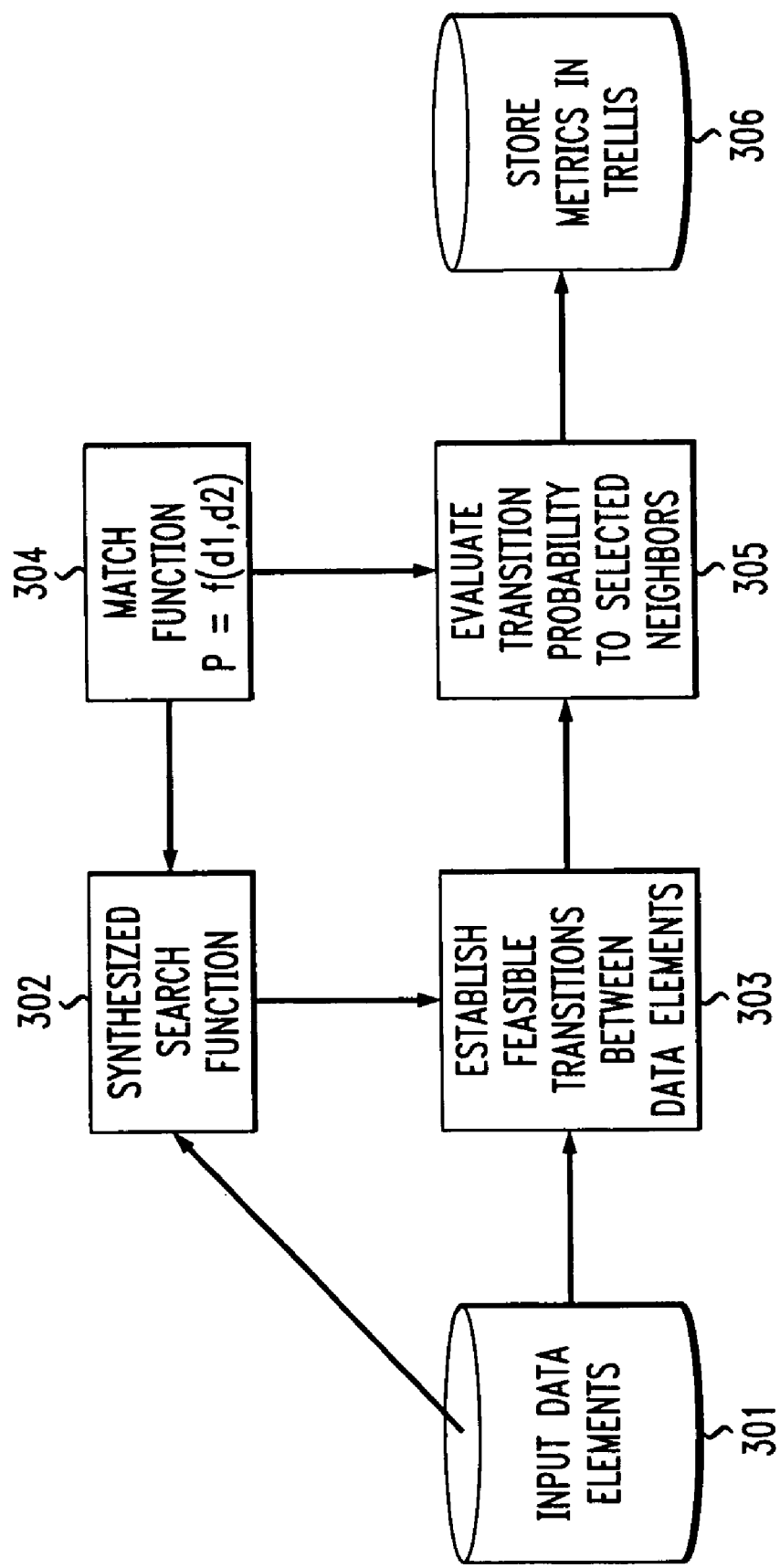
FIG. 3 is a flow diagram illustrating incorporation of the synthesis of search functions to track objects according to one embodiment of the present invention.
Figure 5:
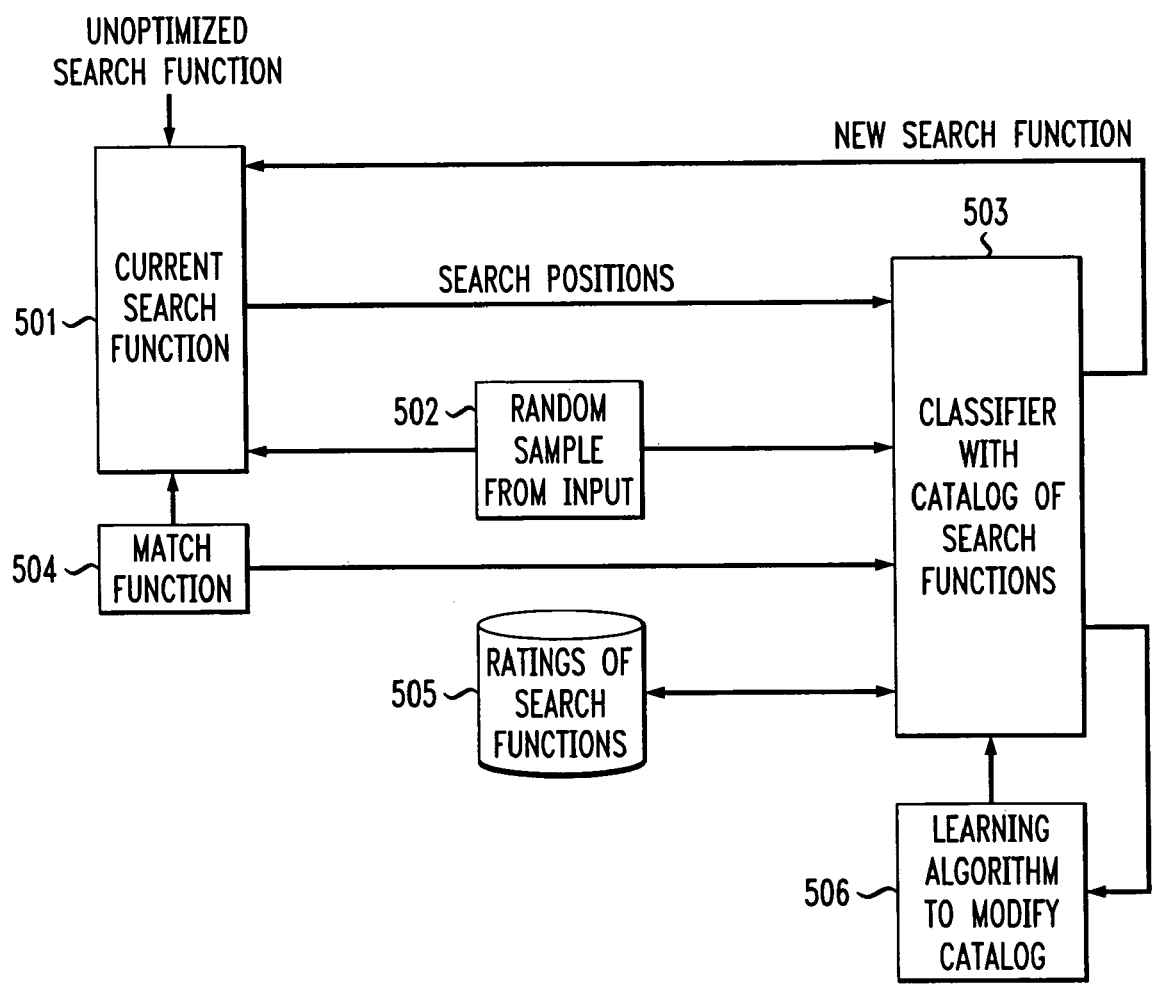
FIG. 5 is a flow diagram illustrating automatic synthesis of a search function according to one embodiment of the present invention.
Figure 6:
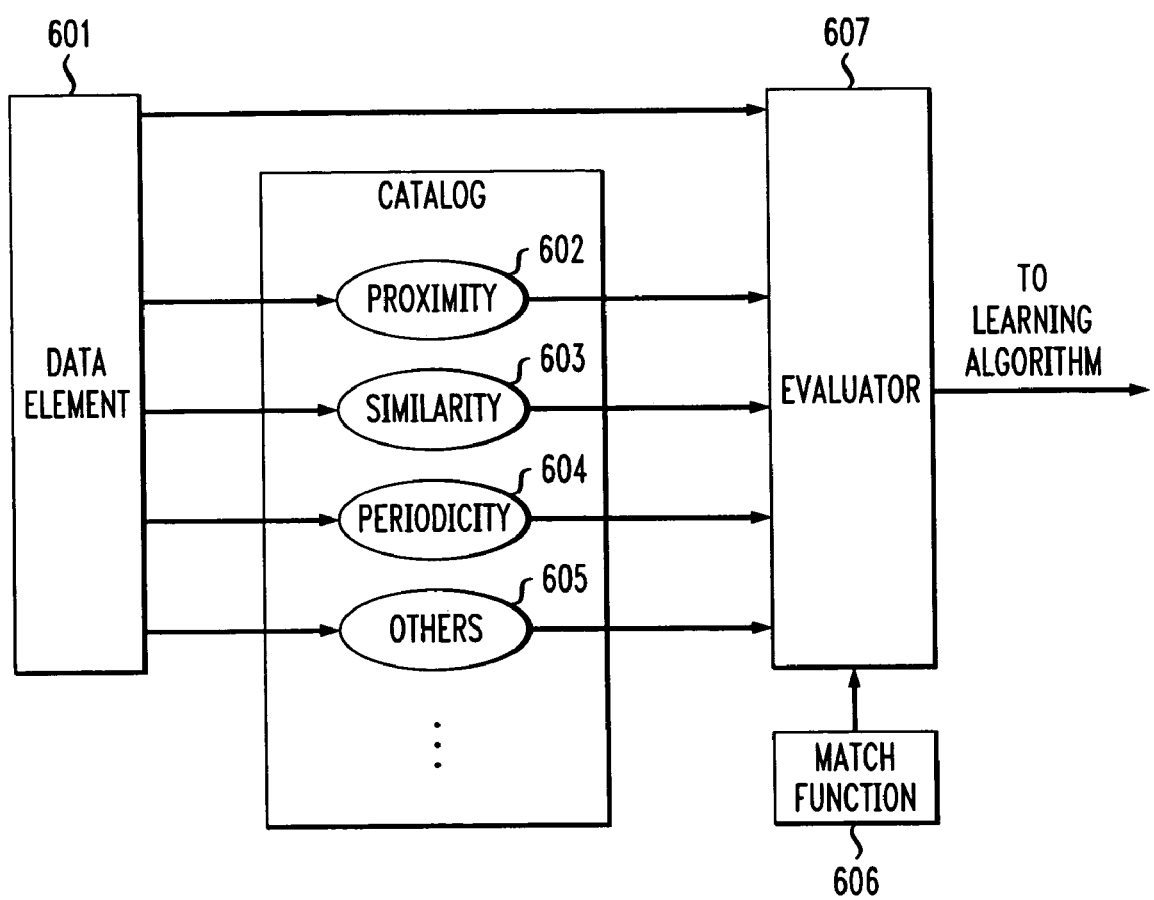
FIG. 6 illustrates a sample catalog of search functions.
Figure 8:
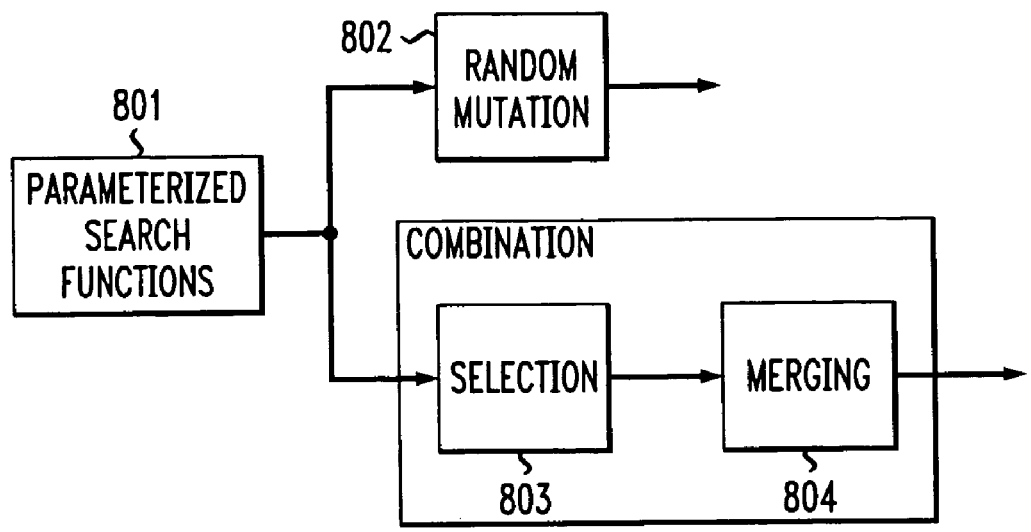
FIG. 8 is a flow diagram illustrating adaptation of the search functions via a genetic algorithm according to one embodiment of the present invention.

Referring now to FIG. 2, a block diagram illustrates a more detailed object tracking system according to one embodiment of the present invention. In particular, FIG. 2 illustrates interactions between a user and the object tracking system of the invention, as well as a data flow from the raw data to the object tracking output. This figure comprises several modules of complex function. Several blocks from this overview figure are described in more detail in succeeding figures. For example, FIG. 3 illustrates in more detail the process of the run-time system. FIG. 5 illustrates the internal functions of a synthesizer according to the invention. FIG. 6 illustrates the internal functions of a classifier associated with a synthesizer according to the invention. FIG. 8 illustrates the process of adaptively mutating and combining search functions according to the invention. Referring back to FIG. 2, the blocks above the dashed line (generally labeled as "pre-processing") represent parts of the system of the invention that are used to construct and/or configure the components of the object tracking system that are used to actually generate (or "track") objects, while the blocks below the dashed line (generally labeled "run-time system") represent the components of the object tracking system that are used to actually generate or track objects. Thus, blocks 201 and 205 in FIG. 2 may represent block 101 in FIG. 1; blocks 203, 204, 206 and 207 in FIG. 2 may be understood to be implementing block 103 in FIG. 3; and block 202 in FIG. 2 may represent block 104 in FIG. 1. For the sake of clarity, a feature extraction module is not shown in FIG. 2. However, it is to be appreciated that the feature extraction operation (represented as block 102 in FIG. 1) is performed between block 205 and block 204 of FIG. 2. While the pre-processing blocks are shown as being part of the same overall system as the run-time blocks, it is to be understood that this not a requirement. That is, the pre-processing operations to determine one or more optimized search functions for use by the run-time system may be implemented separately from the run-time system.

As shown in FIG. 2, a user 200 specifies to the system a data set 201 for segmentation into objects 202 and a match function 203 which evaluates the probability that two data elements from the set are part of the same object. That is, the user specifies or inputs to the system which data set he/she wishes to process and the match function criterion he/she wishes to employ. This data set 201 may be an image about which the user has some a priori knowledge. From this knowledge, the user may also specify or supply some basic unoptimized search functions 206 which the system optimizes automatically through the synthesizer 207 into an optimized search function 204. If the user chooses not to supply any search functions, the system uses a preset catalog of default search functions and optimizes them for the input data elements. Likewise, a catalog of match functions may be stored and then selected by the user or by the system.

Note the different roles played by the search function (206, 204) and the match function (203). The match function, $f$, between two data elements d1 and d2 is usually expressed as $P=f(d1, d2)$. The match function returns a score, P, which describes the likelihood that the two data elements d1 and d2 belong to the same object. The search functions are used to look for candidates of data elements to be matched. Examples of search functions may include, but are not limited to, one or more of the following criterion.

(i) Proximity: If the candidates occur either spatially or temporally adjacent to one another, then it is possible to infer that these two elements belong to the same object (which can be a phenomenon if the data being considered is a time series). Consequently, a proximity-based search function searches for candidates based on spatial and/or temporal adjacency.

(ii) Similarity: The data elements are considered to belong to the same object if the feature vectors capturing the candidate data elements are close to each other in the feature space. Consequently, a similarity-based search function searches for candidates based on the similarity in the feature space. Depending on the data modalities, there are many different ways of representing data elements as feature vectors. As an example, a segment of an image can be represented by its texture, color histogram, and shape.

(iii) Periodicity: Two data elements can be considered to belong to the same object if they have similar periodicity. Data elements correlated in spatial frequency can represent a salient pattern which should be aggregated into an object. Consequently, this criterion can be used to search for other data elements.

By optimizing these search functions, the system is able to dramatically reduce the number of data element combinations that must be evaluated by the match function in order to produce high-probability groupings. It is assumed that there is some cost associated with evaluating the match function for a pair of data elements, and that by evaluating the match function for fewer pairs, savings are achieved. This cost is commonly manifested in computation time, though it may be in other forms such as power consumption or memory space. The data set 205 may be a representative subset or random sample of a much larger data set which the user wishes to group into objects. The search functions which have been optimized for the subset 205 can be used to more efficiently process the whole data set 201. While a set of objects 202 is produced as the output of this processing sequence associated with the system, the synthesizer 207 within the system advantageously produces the search functions which reduce the overall cost of the system. Thus, in accordance with this system, the groupings of data elements with the highest score are produced as the single set of objects.

FIG. 3 is a flow diagram illustrating incorporation of the synthesis of search functions to track objects according to one embodiment of the present invention. Specifically, FIG. 3 illustrates a preferred embodiment for incorporating a synthesizer (such as synthesizer 207 shown in FIG. 2) into the object tracking system of the present invention. In this system, the input data elements from a storage unit 301 and a prestored catalog of match functions 304 are used to generate a synthesized search function 302. The synthesized search function 302 identifies feasible transitions between data elements in step 303. A selection from the catalog of match functions 304 is then made to evaluate, in step 305, the transition probabilities for those transitions to selected neighbors identified in step 303. The end result is then stored in a trellis storage unit 305. Note that instead of generating simple objects (such as objects 202 as shown in FIG. 2), the system may preferably utilize a trellis 306 to find the most probable association of an object. The trellis concept is explained in detail below.

Figure 4:
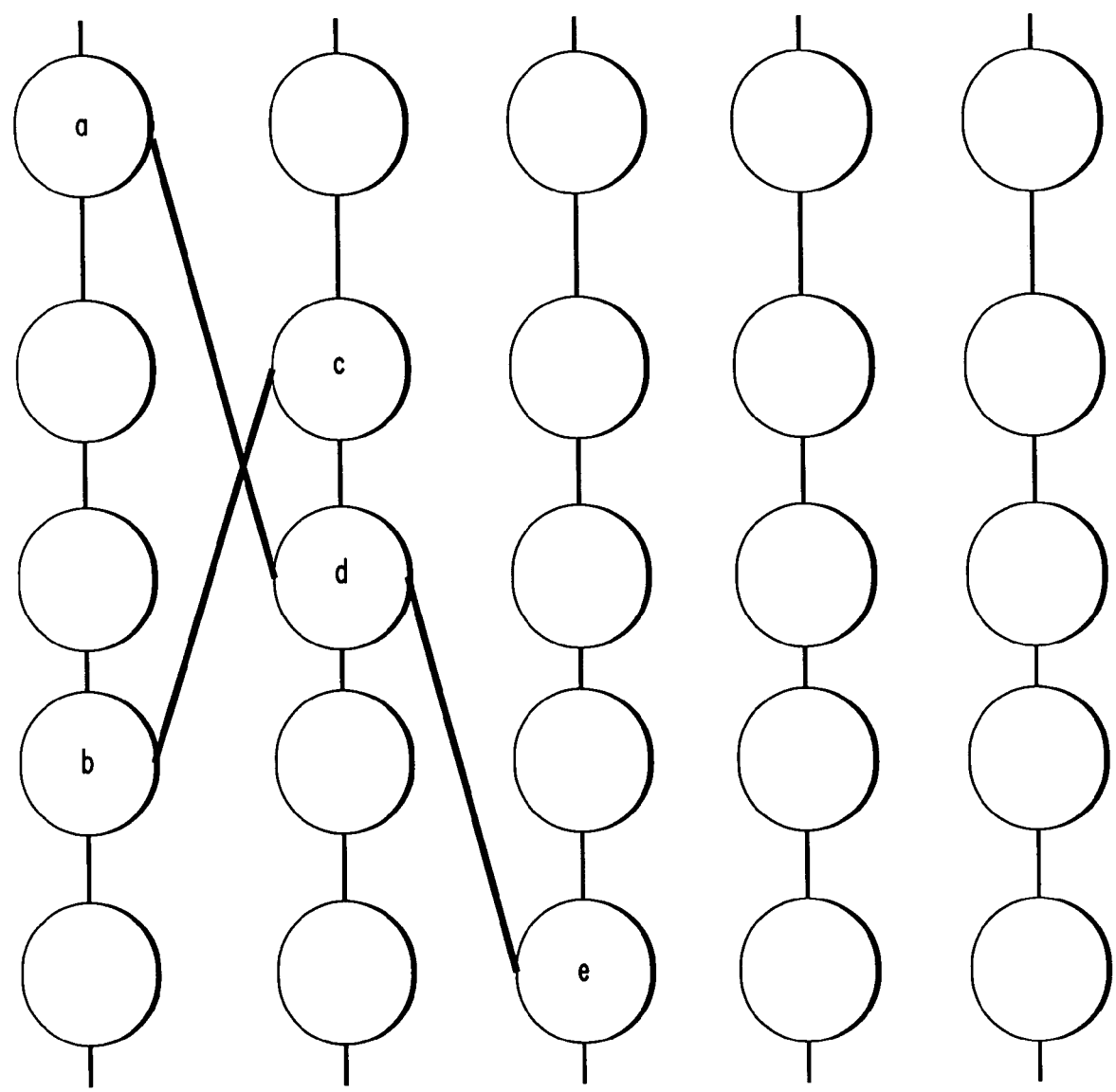
FIG. 4 illustrates an example of a trellis diagram.

A trellis for use in accordance with the present invention can be conceptualized as a two-dimensional grid of N by K, where N is the number of raw data elements in the input set, and K is the number of stages that need to be considered for identifying the association of an object. A set of data elements comprising an object can be expressed in a trellis as a path of edges from the left side of the grid through some number of vertices. FIG. 4 shows an example of a trellis containing five data elements 401, 402, 403, 404 and 405 that have been segmented into two objects. One object comprises elements a (401), d (404) and e (405), while the other object comprises of b (402) and c (403). A trellis is sparse with respect to the number of paths through it if each vertex can only be a member of one object. In this manner, each row of vertices in the trellis, representing a single data element, will have at most one vertex with at most one incoming edge and one outgoing edge. This implies that each row will be a member in at most one path. With this restriction, any data element belongs to at most one object. Therefore, an object is represented by a path through the trellis.

Alternatively, in another preferred embodiment, the paths through the data elements in the trellis could be permitted to traverse rows without the above-specified restriction. This allows data elements to be classified as belonging to more than one object. This may make sense if the definitions of the objects which the data elements are being grouped into are not mutually exclusive. It can also be interpreted as a fuzzy object model, in which a data element is assigned a fuzzy membership value between zero and one based on the strength of the edge. The edge strength is the output of the match function. If the match function were evaluated for every pair of vertices, the trellis could be completely filled in with edges that represented the probability of a data element belonging to a certain object. An exhaustive search algorithm could enumerate and evaluate all the paths within the trellis. However, the total number of paths that need to be evaluated would be on the order of $O(N^K)$. This makes enumeration of all the possibilities intractable for even relatively small values of N and K. As an example, the total number of possible paths that would need to be evaluated for N=100 and K=5 is $N^K=100^5=10^{10}$ or 10 billion possibilities.

Instead of generating and evaluating all the possible paths, the present invention synthesizes and utilizes a search function to selectively generate and evaluate only a subset of the possible paths. This subset is predicted to contain those trellis paths with the highest probabilities. The number of high-probability paths is likely to be small if the ratio of data elements to objects is very high. In one minute of a video sequence at a typical computer's resolution, for instance, 23 million pixels (1024 times 768 pixels per frame and 30 frames per second) are segmented into less than 100 objects.

Referring now to FIG. 5, a flow diagram illustrates automatic synthesis of a search function according to one embodiment of the present invention. More specifically, FIG. 5 depicts an overview of the data flow involved in an iterative and adaptive synthesis of a search function according to the present invention. For example, FIG. 5 may be understood to illustrate the internal functions of synthesizer 207 in FIG. 2.

A catalog of search functions is collected and maintained in a table depicted as classifier 503. The synthesis process is initialized either with a search function selected by a user for a particular application or with a default search function. One search function is maintained as the current search function 501. A pair of data elements 502 is selected at random (random sample) from the input data set and is passed as input to the catalog 503. The pair is also passed to the current search function 501. Both the current search function 501 and the classifier with the catalog of search functions 503 have access to the match function 504. Alternative approaches of performing the search functions are compared and search function ratings resulting from the comparison are stored in block 505. A learning algorithm 506 is used to adaptively adjust the catalog of search functions, as will now be explained.

Further, as shown in FIG. 5, it is be understood that the phrase "search positions" represents a list of positions, generated by the current search function 501, that is passed as an input to block 503. As will be evident below, FIG. 6 represents internal operations of block 503, and the data element 601 represents an entry in the list of positions to be evaluated by block 607 and 602-605.

A process of determining the most suitable search function is shown in FIG. 6. More particularly, FIG. 6 may be understood to illustrate the functions of classifier 503 in FIG. 5. Given an input data element, each of the candidate search functions in a catalog of search functions, such as a proximity-based function 602, a similarity-based function 603, a periodicity-based function 604, or other schemes 605, is used to locate a possible candidate data element 601 for evaluation in block 607. The evaluation of the search function also requires the use of the appropriate match function 606. The output of the evaluator 607, which is the performance of the candidate search functions, is sent to a learning algorithm.

Figure 7:
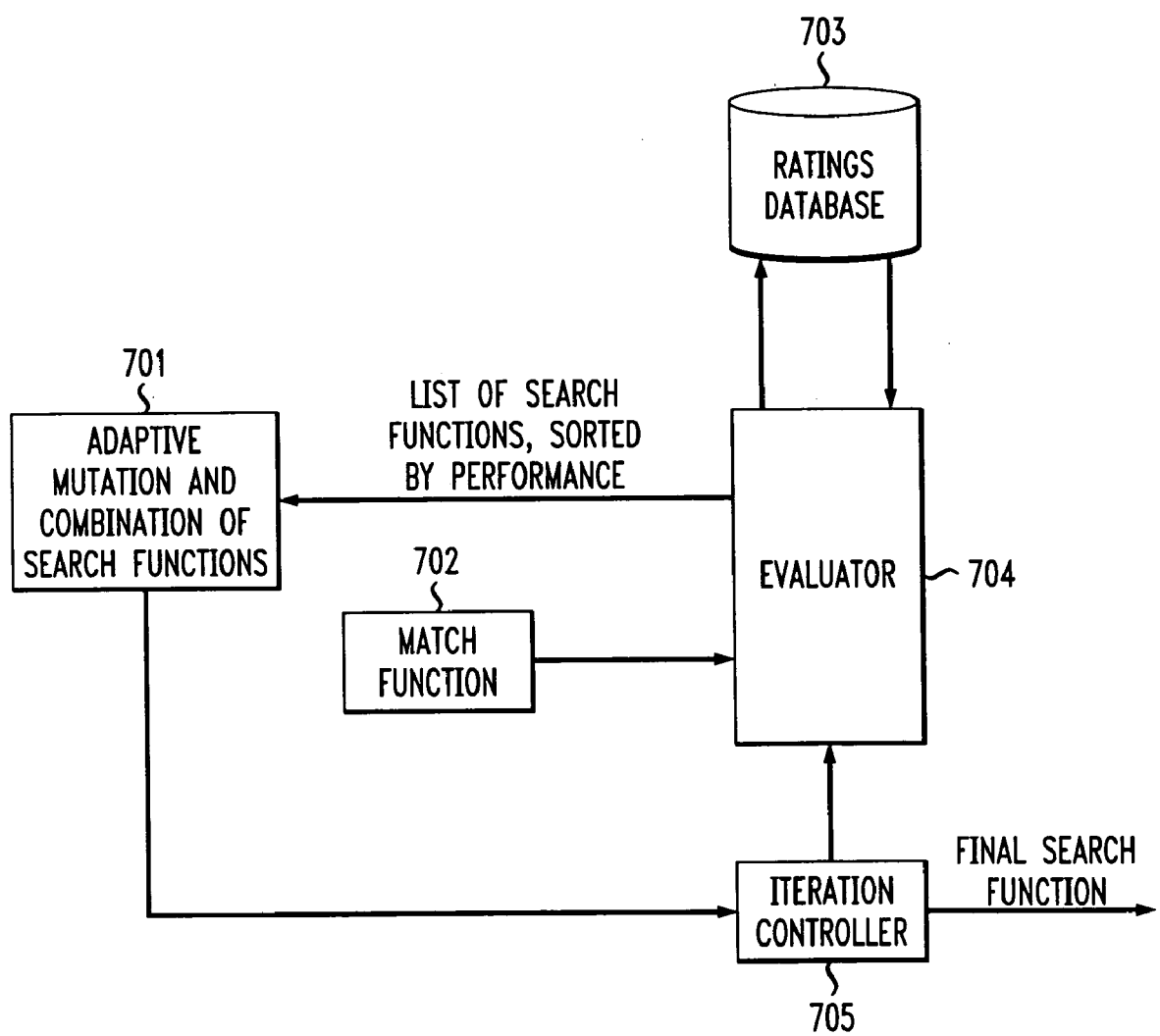
FIG. 7 is a block diagram illustrating a learning component of the synthesis of a search function according to one embodiment of the present invention.

FIG. 7 is a block diagram illustrating a learning component for use in the synthesis of a search function according to one embodiment of the present invention. Specifically, the process of adaptively revising the learning function is shown in FIG. 7. Starting with the list of search functions generated as described in the context of FIG. 6 (sorted by the relative performance), the search functions can be mutated and potentially combined with other search functions in block 701. This function will be further explained in the context of FIG. 8. The results from the mutated search function are then evaluated by evaluator 704. The evaluator has access to match function 702. The evaluation results are then stored in the rating database 703. This process is iterated until either the maximum iteration count is reached or the search performance can no longer be improved. The iterative process is controlled by the iteration controller 705. The outcome becomes the final search function used by the tracking system.

The mutation and combining step 701 in FIG. 7 is further explained in the context of FIG. 8. Starting with parameterized search functions 801, the search functions may be mutated or combined as follows. In block 802, a search function may be randomly mutated. Random mutation involves the generation of new parameters for the parameterized search function. As an example, a parameterized proximity-based search function can be a search of a region with radius R pixels. This radius can be generated randomly, at least, initially. It can also be determined with a default for a given application domain. Subsequent changes of the radius will then be randomized. In block 805, search functions may be combined as follows. The search functions to be combined are selected in block 803 and then merged in block 804. For example, a search function can be a combination of both proximity and similarity. Note that the decision to combine search functions is highly domain-specific. A knowledge base for each application domain can be established to facilitate the decision.

We now provide an example of an application of the present invention with reference to the functional components of the system described above in the context of FIGS. 2 and 5-8. Such an example serves to further explain the functional interaction of the components illustrated in those figures.

The SOHO earth-orbiting satellite generates an image sequence consisting of snapshots of the sun, taken approximately every 17 minutes. This data is recorded for astronomers to observe events on the surface of the sun. These events typically consist of sunspots changing size and brightness. An automatic system for identifying, classifying, storing and indexing sunspots would be of great utility to astronomers. The present invention could implement a critical part of such a system as follows.

Each image in the sequence captured by the satellite consists of about 1 million individual pixels, each of which has a position and brightness. In this example, a user who wishes to use the invention to group these pixels into sunspots needs to supply two inputs to the invention: (1) the data elements to be grouped, in this case, the images; and (2) a match function. The match function embodies the rule which the user wishes to apply to group pixels into sunspots. The characteristics of a spot in an image are relatively homogenous brightness and spatial contiguity. This could be expressed mathematically as the sum of the difference of two points in brightness and their distance from one another. Alternatively, the match function could be expressed as an example area, in which the user manually classifies each pixel in the example area into one spot or another. The match function simply needs to provide a metric as to whether two arbitrary pixels are in the same spot or not.

The user could optionally supply an initial search function, however for this example, we will assume the user does not, and therefore the system generates an initial search function with random parameters. This is an unoptimized search function, as in block 206 of FIG. 2. The search function, given one point (data element) location as input, generates a list of positions at which the match function should be evaluated. If the match function value is high between the search function input point and a point in the search function output list, the two points are part of the same spot. However, with an unoptimized, random search function, the list of points such a search function generates will be randomly distributed throughout the image, and the chances of two random points belonging to the same spot are low. Therefore, the match function would have to be evaluated many times before many pixels would be grouped together. To improve performance, as explained above, the system of the invention optimizes the search function using a synthesizer, as in block 207 of FIG. 2. The synthesizing process associated with synthesizer 207 is detailed in FIG. 5.

The search function is used to generate a sample list of points, which are evaluated by the match function. Then, the system performs one or more of the following operations: (1) the search function is copied and modified by a random mutation of its parameters; (2) a completely new search function is randomly generated; (3) parameters from other search functions are combined to make a new function; or (4) a new search function is chosen from a catalog (blocks 602-605 in FIG. 6). The choice of what operation occurs is implementation-dependent. This second search function also generates a list of points, for the same input point used by the first search function. The evaluator, as in block 607 of FIG. 6, likewise applies the match function to this list of points. It then determines which search function is better, for example, by comparing the match function output for each list. An illustrative embodiment may simply take the average match function output for each list as the criteria for ranking (rating) search functions. This process is repeated until a given performance level (match function criteria) is met. Then, the search function meeting that criteria is considered optimized, and can be applied to the whole data set, instead of just this training sample.

The random search functions, at first, produce random points in the solar images of this example. However, given two functions, one will likely perform better than the other. The one that performs better will likely be the one that generates points close to the input point, because sunspots are spatially contiguous. The process therefore converges on a search function which searches the local area of a point for other pixels belonging to the same sunspot. It is to be understood that this "learning" process of convergence by random mutation and combination is well-known and described in the literature of genetic algorithms. Some examples of genetic algorithms that may be employed are described in T. Baeck, "Genetic Algorithms in Theory and Practice," Oxford: The Oxford University Press, 1996; and J. H. Holland, "Adaptation in Natural and Artificial Systems," Ann Arbor: The University of Michigan Press; Second Edition, MIT Press, 1992, the disclosures of which are incorporated by reference herein. However, the learning module 506 of FIG. 5 is not restricted to a genetic algorithm.

It is to be appreciated that while generation of an optimized search function is illustratively described above based on a randomly selected portion of data elements from the subject data element set, generation of an optimized search function may be based on a regularly sampled portion of the data elements, a pseudo-randomly sampled portion of data elements, a portion of data elements sampled according to a space-filling curve, and/or some other suitable method. Also, it is to be understood that the above-described learning process may include comparing unoptimized search functions with search functions that have already been optimized. In this case, incremental learning is provided where new unoptimized search functions are added to the process and compared to the current best search function.

Figure 9:
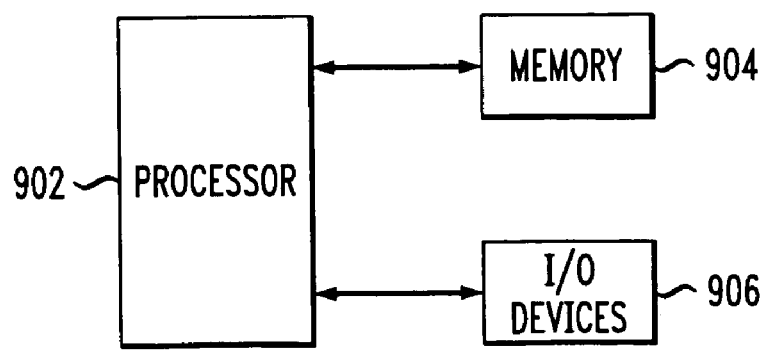
FIG. 9 is a block diagram illustrating a generalized hardware architecture of a computer system suitable for implementing object tracking according to the present invention.

Referring now to FIG. 9, a block diagram is shown illustrating a generalized hardware architecture of a computer system suitable for implementing an object tracking methodology according to the invention as described in detail herein. As shown, the system may be implemented in accordance with a processor 902, a memory 904 and I/O devices 906. It is to be appreciated that the term "processor" as used herein is intended to include any processing device, such as, for example, one that includes a CPU (central processing unit) and/or other processing circuitry. The processor may be a digital signal processor, as is well known in the art. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data to the processing unit, and/or one or more output devices (e.g., CRT display, printer, etc.) for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

It is to be appreciated that in a client-server networked information embodiment, all or portions of the system may be implemented on a server-based computer system having a configuration as shown in FIG. 9, while entry of user-provided data, e.g., specification of raw data to be processed and one or more search fumctions to be used, may be done on a client-based computer system also having a configuration as shown in FIG. 9. Such computer systems may be coupled via a suitable network (e.g., Internet, Intranet, etc.). In such case, the user may view results of the object tracking operations at the client computer upon receipt from the server.

Accordingly, as has been explained in detail above, an object tracking technique is provided which, given: (i) a potentially large data set; (ii) a set of dimensions along which the data has been ordered; and (iii) a set of functions for measuring the similarity between data elements, a set of objects are produced. Each of these objects is defined by a list of data elements. Each of the data elements on this list contains the probability that the data element is part of the object. The method produces these lists via an adaptive, knowledge-based search function which directs the search for high-probability data elements. This serves to reduce the number of data element combinations evaluated while preserving the most flexibility in defining the associations of data elements which comprise an object.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of generating an optimized search function for use in segmenting a set of data elements into one or more groups of data elements representing one or more objects, the method comprising the steps of:

obtaining two or more search functions;

evaluating the two or more search functions to determine which one of the two or more search functions substantially meets a particular match function, wherein the match function comprises a probability that two data elements of the set of data elements represent part of one of the one or more objects;

identifying the search function which substantially meets the match function as the optimized search function for use in segmenting a set of data elements into one or more groups of data elements representing one or more objects; and storing the identified search function in a storage unit for subsequent use in segmenting the set of data elements into the one or more groups of data representing the one or more objects.

2. The method of claim 1, wherein the optimized search function is generated based on a randomly selected portion of data elements from the set of data elements.

3. The method of claim 1, wherein at least one of the two or more search functions is unoptimized.

4. The method of claim 1, wherein at least one of the two or more search functions are selected from a catalog of candidate search functions.

5. The method of claim 1, wherein the set of data elements comprises unstructured image data.

6. Apparatus for generating an optimized search function for use in segmenting a set of data elements into one or more groups of data elements representing one or more objects, the apparatus comprising:

at least one processor operative to: (i) obtain two or more search functions; (ii) evaluate the two or more search functions to determine which one of the two or more search functions substantially meets a particular match function, wherein the match function comprises a probability that two data elements of the set of data elements represent part of one of the one or more objects; (iii) identify the search function which substantially meets the match function as the optimized search function for use in segmenting segment a set of data elements into one or more groups of data elements representing one or more objects; and (v) store the identified search function in a storage unit for subsequent use in segmenting the set of data elements into the one or more groups of data representing the one or more objects.

7. The apparatus of claim 6, wherein the optimized search function is generated based on a randomly selected portion of data elements from the set of data elements.

8. The apparatus of claim 6, wherein at least one of the two or more search functions is unoptimized.

9. The apparatus of claim 6, wherein at least one of the two or more search functions are selected from a catalog of candidate search functions.

10. The apparatus of claim 6, wherein the set of data elements comprises unstructured image data.

11. An article of manufacture for generating an optimized search function for use in segmenting a set of data elements into one or more groups of data elements representing one or more objects, the article comprising a machine readable medium containing one or more programs which when executed implement the steps of:

obtaining two or more search functions;

evaluating the two or more search functions to determine which one of the two or more search functions substantially meets a particular match function, wherein the match function comprises a probability that two data elements of the set of data elements represent part of one of the one or more objects;

identifying the search function which substantially meets the match function as the optimized search function for use in segmenting a set of data elements into one or more groups of data elements representing one or more objects; and storing the identified search function in a storage unit for subsequent use in segmenting the set of data elements into the one or more groups of data representing the one or more objects.

12. The article of manufacture of claim 11, wherein the optimized search function is generated based on a randomly selected portion of data elements from the set of data elements.

13. The article of manufacture of claim 11, wherein at least one of the two or more search functions is unoptimized.

14. The article of manufacture of claim 11, wherein at least one of the two or more search functions are selected from a catalog of candidate search functions.

15. The article of manufacture of claim 3, wherein the set of data elements comprises unstructured image data.

* * * * *